United States Patent
Davis

(10) Patent No.: US 8,300,780 B1
(45) Date of Patent: Oct. 30, 2012

(54) SMART CAPTURE FOR POPULATING AN ADDRESS BOOK WITH ENTRIES

(75) Inventor: Angus Macdonald Davis, Providence, RI (US)

(73) Assignee: TellMe Networks, Inc., Mountain View, CA (US)

( * ) Notice: Subject to any disclaimer, the term of this patent is extended or adjusted under 35 U.S.C. 154(b) by 1468 days.

(21) Appl. No.: 11/051,939

(22) Filed: Feb. 3, 2005

(51) Int. Cl.
*H04M 1/64* (2006.01)

(52) U.S. Cl. .................. 379/88.19; 379/88.21; 455/415; 715/739

(58) Field of Classification Search ............... 379/218, 379/88, 207, 67.1, 88.19, 88.21, 142.01, 379/142.04, 142.06, 142.1, 142.15; 455/403, 455/414.1, 415; 715/700, 733, 738, 739
See application file for complete search history.

(56) References Cited

U.S. PATENT DOCUMENTS

| | | | | |
|---|---|---|---|---|
| 5,604,492 A | * | 2/1997 | Abdul-Halim | 340/7.53 |
| 5,652,789 A | | 7/1997 | Miner et al. | 379/201 |
| 6,021,181 A | | 2/2000 | Miner et al. | 379/88.23 |
| 6,047,053 A | | 4/2000 | Miner et al. | 379/201 |
| 6,564,264 B1 | | 5/2003 | Creswell et al. | |
| 6,687,362 B1 | * | 2/2004 | Lindquist et al. | 379/218.01 |
| 6,804,332 B1 | | 10/2004 | Miner et al. | 379/88.13 |
| 7,068,768 B2 | * | 6/2006 | Barnes | 379/142.15 |
| 7,304,983 B2 | * | 12/2007 | Simpson et al. | 370/352 |
| 2002/0151334 A1 | | 10/2002 | Sharma | |
| 2003/0027602 A1 | * | 2/2003 | Han et al. | 455/566 |
| 2003/0091173 A1 | * | 5/2003 | DeSalvo | 379/142.01 |
| 2003/0195845 A1 | * | 10/2003 | Anton et al. | 705/40 |
| 2004/0133440 A1 | * | 7/2004 | Carolan et al. | 705/1 |
| 2004/0266414 A1 | * | 12/2004 | Likwornik | 455/415 |
| 2005/0249344 A1 | * | 11/2005 | Mueller et al. | 379/207.15 |
| 2006/0093097 A1 | * | 5/2006 | Chang | 379/88.01 |
| 2006/0128404 A1 | * | 6/2006 | Klassen et al. | 455/466 |

OTHER PUBLICATIONS

U.S. Appl. No. 11/285,394, filed Nov. 23, 2005, Kunins et al.

* cited by examiner

*Primary Examiner* — Khai N Nguyen
(74) *Attorney, Agent, or Firm* — Perkins Coie LLP

(57) ABSTRACT

One embodiment in accordance with the invention is a method that includes automatically identifying a telephone number associated with an incoming or outgoing telephone call. The telephone call is associated with a telephone system account. A name is automatically determined that corresponds to the telephone number. The name and the telephone number are automatically stored in association with an electronic address book.

19 Claims, 9 Drawing Sheets

SMART CAPTURE FOR POPULATING AN ADDRESS BOOK WITH ENTRIES

BACKGROUND

Some wireless mobile telephone service providers offer their customers a service referred to as voice dialing. One way for a customer to utilize this service is by simply pressing a particular button on their mobile phone thereby wirelessly connecting the phone to a voice dialing application. This service may also be available to customers as a replacement of the traditional "dial tone" experience, allowing the customer to dial by name simply by picking up a traditional telephone handset off the hook. As such, an automated audio prompts the customer to say the name of the person that he or she wishes to call. Once the customer has spoken the name of the person, the voice dialing application utilizes speech recognition to interpret the spoken name. Subsequently, the voice dialing application references the customer's electronic network address book to determine the phone number that corresponds with the spoken name. Once determined, the voice dialing application automatically dials the phone number for the customer. In this manner, the customer is able to easily call people just by speaking their name to the voice dialing application.

It is understood that in order for the voice dialing application to operate properly, the customer's network address book has to include the names and corresponding telephone numbers of those people that the customer would like to call. As such, the voice dialing application is typically only able to automatically dial those people whose name and corresponding phone number are stored in the customer's network address book. Other telephone applications including voicemail, ringtones, ringback tones, conference calling and other enhanced voice and data services may also share access to this same network address book; voice dialing is but one example of a multitude of services that depend upon a network address book.

One common way for adding people's names and corresponding telephone numbers into a customer's network address book is for the customer to use a computer system having access to the Internet and visit a web site interface where each individual name and corresponding phone number is typed into a form, one by one. However, this technique can be time consuming for a customer wanting to add a significant number of people's names and corresponding phone numbers.

Another common way for adding people's names and corresponding telephone numbers into a customer's network address book is for the customer to use a telephone interface where each individual name and corresponding phone number is spoken, one by one. Notwithstanding, this telephone technique can also be time consuming for a customer wanting to add a significant number of people's names and corresponding phone numbers.

Yet another common way for adding people's names and corresponding phone numbers into a customer's network address book is for the customer to synchronize an existing electronic address book that includes the desired information with the customer's network address book. Nevertheless, this synchronization technique can present a sizable adoption barrier for those that are either intimidated by technology or are unfamiliar with it.

SUMMARY

One embodiment in accordance with the invention is a method that includes automatically identifying a telephone number associated with an incoming or outgoing telephone call. Incoming calls may include both calls that ring through to the customer and calls that are intercepted by an automated telephone answering system. Outgoing calls may include direct-dialed calls to specific telephone numbers or calls placed through a directory assistance service. The telephone call is associated with a telephone system account. A name is automatically determined that corresponds to the telephone number. The name and the telephone number are automatically stored in association with an electronic address book.

Another embodiment in accordance with the invention is a method that includes identifying automatically a telephone number of a received telephone call or data (e.g., text) message associated with a telephone system account. An audible name is automatically prompted to be provided. The audible name is automatically recorded to produce a recorded audible name. The recorded audible name is translated automatically into electronic data representing the recorded audible name. The electronic data and the telephone number are automatically stored in association with an electronic address book.

Yet another embodiment in accordance with the invention is a method that includes automatically accessing a historical telephone call or data (e.g., text) message record associated with a telephone system account. A telephone number is automatically identified of the historical telephone call record. A name is automatically determined corresponding to the telephone number. The name and the telephone number are automatically stored in an electronic address book.

Yet another embodiment in accordance with the invention is a method that includes an automated system analyzing electronic mail messages to identify a telephone number associated with the sender of an electronic mail message. Upon identifying the telephone number, a name is determined that corresponds to the telephone number. In response to determining the name, the name, telephone number and any other pertinent information can be stored in association with an electronic address book.

Still another embodiment in accordance with the invention is a method that includes automatically detecting a predefined condition. In response to detecting the predefined condition, a telephone number is identified automatically. A name corresponding to the telephone number is determining automatically. The name and telephone number are automatically stored as part of an electronic network address book.

While particular embodiments in accordance with the invention have been specifically described within this summary, it is noted that the invention is not limited to these embodiments. The invention is intended to cover alternatives, modifications and equivalents which may be included within the scope of the invention as construed according to the Claims.

DETAILED DESCRIPTION

Figure 1:
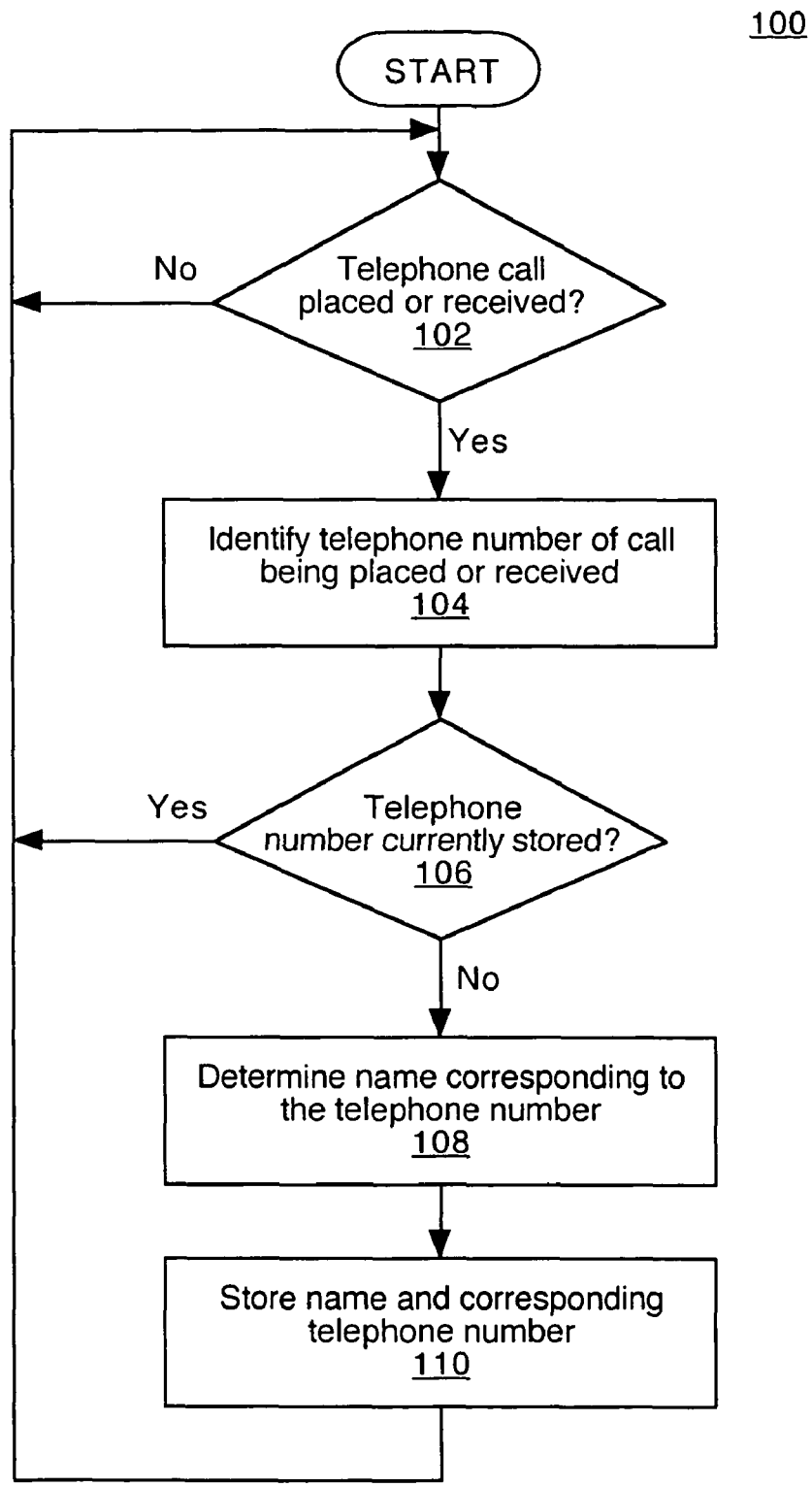
FIG. 1 is a flowchart of a method in accordance with embodiments of the invention for automatically gathering and storing telephone numbers and their corresponding names.

Reference will now be made in detail to embodiments in accordance with the invention, examples of which are illustrated in the accompanying drawings. While the invention will be described in conjunction with embodiments, it will be understood that these embodiments are not intended to limit the invention. On the contrary, the invention is intended to cover alternatives, modifications and equivalents, which may be included within the scope of the invention as construed according to the Claims. Furthermore, in the following detailed description of embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some embodiments in accordance with the invention enable a telephone user to automatically populate (or grow) his or her electronic address book with entries simply by placing and receiving telephone calls. Rather than manually programming an electronic address book (e.g., either on the telephone, through a Web site interface, or through some other electronic interface), some embodiments in accordance with the invention automatically update an electronic address book database by monitoring the user's calling patterns. For example, in one embodiment, when a telephone user places a call, the present embodiment automatically notices the dialed number and automatically lookups a corresponding listing name based on the dialed number. As such, the present embodiment includes the dialed number and its corresponding listing name when adding the entry into the user's electronic address book database.

In addition to making entries based on monitoring telephone call placement activity, some embodiments in accordance with the invention may make electronic address book database entries based on received telephone calls, including those calls that terminate in an actual human conversation and those that terminate in a voice response system, such as voice mail.

Additionally, some embodiments in accordance with the invention support a retroactive capability to automatically build entries in the electronic address book database by analyzing historical telephone call and/or data message records, including telephone call detail records and telephone usage invoices, including use of voice and data services. One benefit associated with embodiments of the invention is that they can make populating a telephone user's electronic address book with entries much easier. Therefore, by making electronic address book entry population easier, embodiments of the invention can in turn lower adoption barriers to enhanced functionality (e.g., voice dialing and other telecommunications services) associated with populated electronic address books.

FIG. 1 is a flowchart of a method 100 in accordance with embodiments of the invention for automatically gathering and storing telephone numbers and their corresponding names. Method 100 includes exemplary processes of embodiments of the invention which can be carried out by a processor(s) and electrical components under the control of computing device readable and executable instructions or code, e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 100, such operations are exemplary. That is, method 100 may not include all of the operations illustrated by FIG. 1. Additionally, method 100 may include various other operations and/or variations of the operations shown by FIG. 1. Likewise, the sequence of the operations of method 100 can be modified. It is noted that the operations of method 100 can each be performed by software, by firmware, by electronic hardware, or by any combination thereof.

Specifically, a determination can be made as to whether a telephone call is being placed from a telephone system account or being received by that telephone system account. If not, the determination can continue. However, if a telephone call is being placed or received, the telephone number can be identified that corresponds to the telephone call. Next, a determination can be made as to whether the identified telephone number is currently stored. If so, method 100 can return to the determination of whether a telephone call is being placed or received. However, if the identified telephone number is not currently stored, the name can be automatically determined which corresponds to the identified telephone number. Subsequently, the determined name and its corresponding telephone number can then be automatically stored.

At operation 102 of FIG. 1, a determination can automatically be made as to whether a telephone call is being placed (e.g., dialed) from a telephone system account or being received by that telephone system account. An incoming or received call may include calls that ring through to a user of the telephone account and/or calls that are intercepted by an automated telephone answering system. An outgoing or placed call may include direct-dialed calls to specific telephone numbers and/or calls placed through a directory assistance service. If neither is detected at operation 102, method 100 can proceed to the beginning of operation 102 in order to repeat it. However, if it is determined at operation 102 that a telephone call is being placed from a telephone system account or being received by that telephone system account, method 100 can proceed to operation 104. It is understood that the determination at operation 102 can be implemented in a wide variety of ways.

For example, one or more applications associated with a telephone system (e.g., wireless and/or wire-line) can be implemented to perform the determination at operation 102.

In one embodiment, an application associated with a telephone system can determine automatically at operation 102 whether a telephone call is being placed from a telephone system account or being received by that telephone system account. In one embodiment, a voice messaging system can be implemented to automatically determine as part of operation 102 whether a specific telephone system account is receiving a telephone call. In one embodiment, a telephone routing system can be implemented to automatically determine at operation 102 whether a telephone call is being placed from and/or received by a specific telephone system account.

At operation 104, the telephone number can automatically be identified that corresponds with the telephone call being placed or received. It is appreciated that the automatic identification of the outgoing or incoming telephone number at operation 104 can be implemented in diverse ways. For example, one or more applications associated with a telephone system (e.g., wireless and/or wire-line) can be implemented to perform the automatic identification of the telephone number at operation 104.

At operation 106 of FIG. 1, a determination can automatically be made as to whether the identified telephone number is currently stored. If so, process 100 can proceed to operation 102. However, if it is determined that the identified telephone number is not currently stored, process 100 can proceed to operation 108. Understand that operation 106 can be implemented in a wide variety of ways. For example, operation 106 can involve searching one or more applications associated with a specific telephone system account (e.g., wireless and/or wire-line) in order to automatically determine whether the identified telephone number is currently stored by one or more electronic data storage devices. Additionally, one of the applications associated with a specific telephone system account at operation 106 may be an electronic address book. The electronic address book can include contact information such as, but not limited to, names, telephone numbers, street addresses, e-mail (electronic mail) addresses, and the like. Furthermore, the electronic address book can be an electronic network address book.

At operation 108, the name can automatically be determined which corresponds to the identified telephone number. Operation 108 can be implemented in a wide variety of ways. For example, one or more databases can be utilized at operation 108 to perform a lookup (e.g., reverse lookup) in order to automatically determine the name corresponding to the identified telephone number. Note that the database can be implemented as, but is not limited to, a public directory database, a telephone directory assistance database, a Line Information Database (LIDB), a private database, a public database, a database resident to a wireless mobile telephone, or any combination thereof. It is appreciated that the name corresponding to a telephone number can include a wide variety of identifiers. For example, the name can include, but is not limited to, an identifier of a person, a business, an organization, an agency, and the like. In addition, the name can be determined through non-automated means by employing the service of a live operator service.

At operation 110 of FIG. 1, the determined name and its corresponding telephone number can be automatically stored. It is understood that the automatic storing at operation 110 can be implemented in a wide variety of ways. For example, the determined name and its corresponding telephone number can be electronically stored automatically at operation 110 as part of a database. In one embodiment, the determined name and its corresponding telephone number can be electronically stored automatically at operation 110 in association with one or more applications (e.g., an electronic address book, an electronic organizer, an electronic network address book, and the like). In another embodiment, the determined name and its corresponding telephone number can be automatically stored at operation 110 as part of an electronic network address book associated with a telephone system account (e.g., wireless and/or wire-line). In yet another embodiment, the determined name and its corresponding telephone number can be automatically stored at operation 110 as part of an electronic address book (or database) resident to a wireless mobile telephone.

In still another embodiment, the determined name and its corresponding telephone number can be automatically stored at operation 110 as part of an electronic network address book associated with a telephone system account (e.g., wireless and/or wire-line) and also can be automatically stored as part of an electronic address book (or database) resident to a wireless mobile telephone. In this manner, with regard to this last recited embodiment, the electronic address book (or database) resident to the mobile telephone can be synchronized with the electronic network address book associated with the telephone system account. It is understood that the telephone system account can be associated with the wireless mobile telephone. Note that once the determined name and its corresponding telephone number are stored at operation 110, they can be accessed and utilized at some subsequent time. Once operation 110 is complete, process 100 can proceed to operation 102.

It is pointed out that method 100, in accordance with some embodiments, can be utilized to automatically populate an electronic address book associated with a telephone system account with telephone numbers along with their corresponding names. In this manner, a user of the telephone system account does not have to exert much (if any) effort in order for his or her electronic address book to be populated with telephone numbers and their corresponding names.

Figure 2:
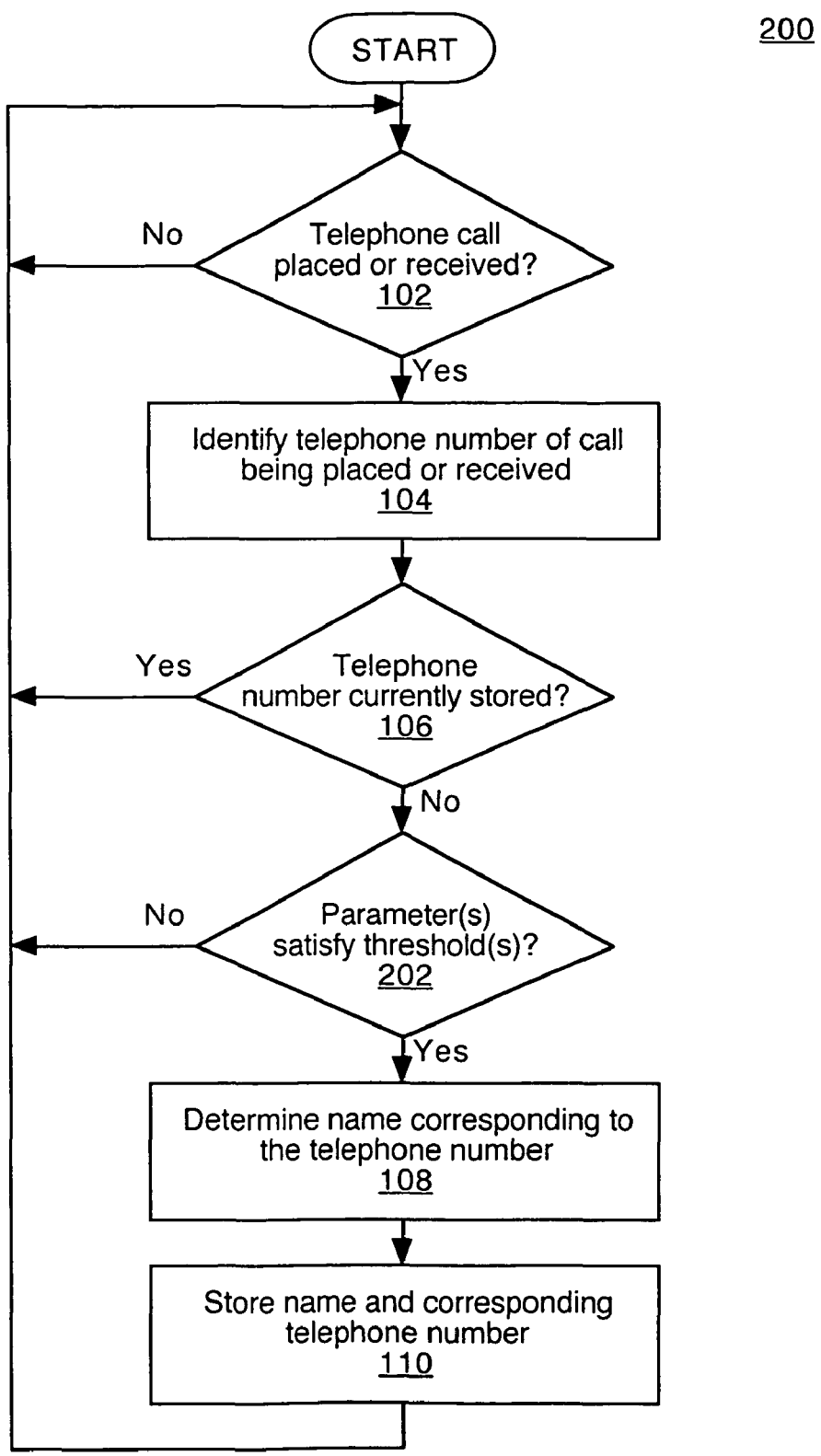
FIG. 2 is a flowchart of a method in accordance with embodiments of the invention for automatically and selectively gathering and storing telephone numbers and their corresponding names.

FIG. 2 is a flowchart of a method 200 in accordance with embodiments of the invention for automatically gathering and storing telephone numbers and their corresponding names based on one or more parameters. Method 200 includes exemplary processes of embodiments of the invention which can be carried out by a processor(s) and electrical components under the control of computing device readable and executable instructions or code, e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 200, such operations are exemplary. That is, method 200 may not include all of the operations illustrated by FIG. 2. Additionally, method 200 may include various other operations and/or variations of the operations shown by FIG. 2. Likewise, the sequence of the operations of method 200 can be modified. It is noted that the operations of method 200 can each be performed by software, by firmware, by electronic hardware, or by any combination thereof.

Specifically, a determination can be made as to whether a telephone call is being placed from a telephone system account or being received by that telephone system account. If not, the determination can continue. However, if a telephone call is being place or received, the telephone number can be identified that corresponds to the telephone call. A determination can next be made as to whether the identified telephone number is currently stored. If so, method 200 can return to the determination of whether a telephone call is being placed or received. If the identified telephone number is not currently stored, a determination can be made as to whether a parameter associated with the telephone call satisfies a threshold. If not, method 200 can return to the determination of whether a telephone call is being placed or received. However, if the parameter associated with the telephone call satisfies the threshold, the name can automatically be determined which corresponds to the identified telephone number. The determined name and its corresponding telephone number can then be automatically stored.

Note that operations 102-110 of method 200 of FIG. 2 can be implemented in any manner similar to that described herein with reference to operations 102-110 of FIG. 1. However, at operation 106 of FIG. 2, if it is determined that the identified telephone number is not currently stored, method 200 can proceed to operation 202.

At operation 202 of FIG. 2, a determination can automatically be made as to whether a parameter associated with the telephone call satisfies a threshold. If the parameter associated with the telephone call fails to satisfy the threshold at operation 202, process 200 can proceed to operation 102. However, if the parameter associated with the telephone call satisfies the threshold at operation 202, process 200 can proceed to operation 108. It is understood that the automatic determination at operation 202 can include one or more parameters along with one or more thresholds. The one or more parameters along with the one or more thresholds associated with the telephone call at operation 202 can each be implemented in a wide variety of ways.

In one embodiment, a parameter associated with the telephone call can include, but is not limited to, a relationship (or tie) between the identified telephone number and another electronic address book (e.g., electronic network address book). For example, a parameter may be defined such that if the identified telephone number is already stored within another specified electronic network address book, the threshold is satisfied. The specified electronic network address book can be associated with the telephone system account or a different telephone system account. The specified electronic network address book can be associated with the same or another user. Note that one or more electronic network address books can be specified. It is appreciated that a user of the telephone system account may be provided the ability to specify (or establish) a relationship upon which a parameter and threshold can be based.

With reference to operation 202, a parameter associated with the telephone call can include, but is not limited to, the number of times the telephone call is placed to or received from the identified telephone number, the duration of the telephone call placed to or received from the identified telephone number, the number of times the telephone call is placed to or received from the identified telephone number within a defined time period (e.g., a day, a week, a month, a year, or any defined time period), and/or if the identified telephone number associated with the telephone call corresponds to a wireless or a wire-line telephone system. It is understood that telephone numbers associated with a wireless telephone system are typically not publicly listed. As such, it may be more efficient for method 200 to exclude them at operation 202. Note that depending on how a parameter is defined for operation 202, a corresponding threshold can be defined.

For example, at operation 202 of FIG. 2, if a parameter is defined as the number of times the telephone call is placed to or received from the identified telephone number, then the threshold may be set or established at five times. As such, when the number of times the telephone call is placed to or received from the identified telephone number is less than five at operation 202, method 200 can proceed to operation 102. However, when the number of times the telephone call is placed to or received from the identified telephone number is equal to five at operation 202, method 200 can proceed to operation 108.

Note that the parameters and thresholds of operation 202 can improve the quality of data that will subsequently be stored (e.g., added to an electronic address book) by reducing the number of undesirable names and telephone numbers. Additionally, the parameters and thresholds of operation 202 can result in reducing the number of times one or more databases are accessed to determined the corresponding name at operation 108. Consequently, expenses can be reduced for a telephone system carrier (or other host of method 200) since often times there is an expense associated with accessing (or using) one or more databases (e.g., directory assistance, and the like).

In accordance with some embodiments, method 200 can be utilized to automatically and selectively populate an electronic address book associated with a telephone system account with telephone numbers along with their corresponding names. In this fashion, the amount of undesirable contact information stored within the electronic address book can be reduced.

Figure 3:
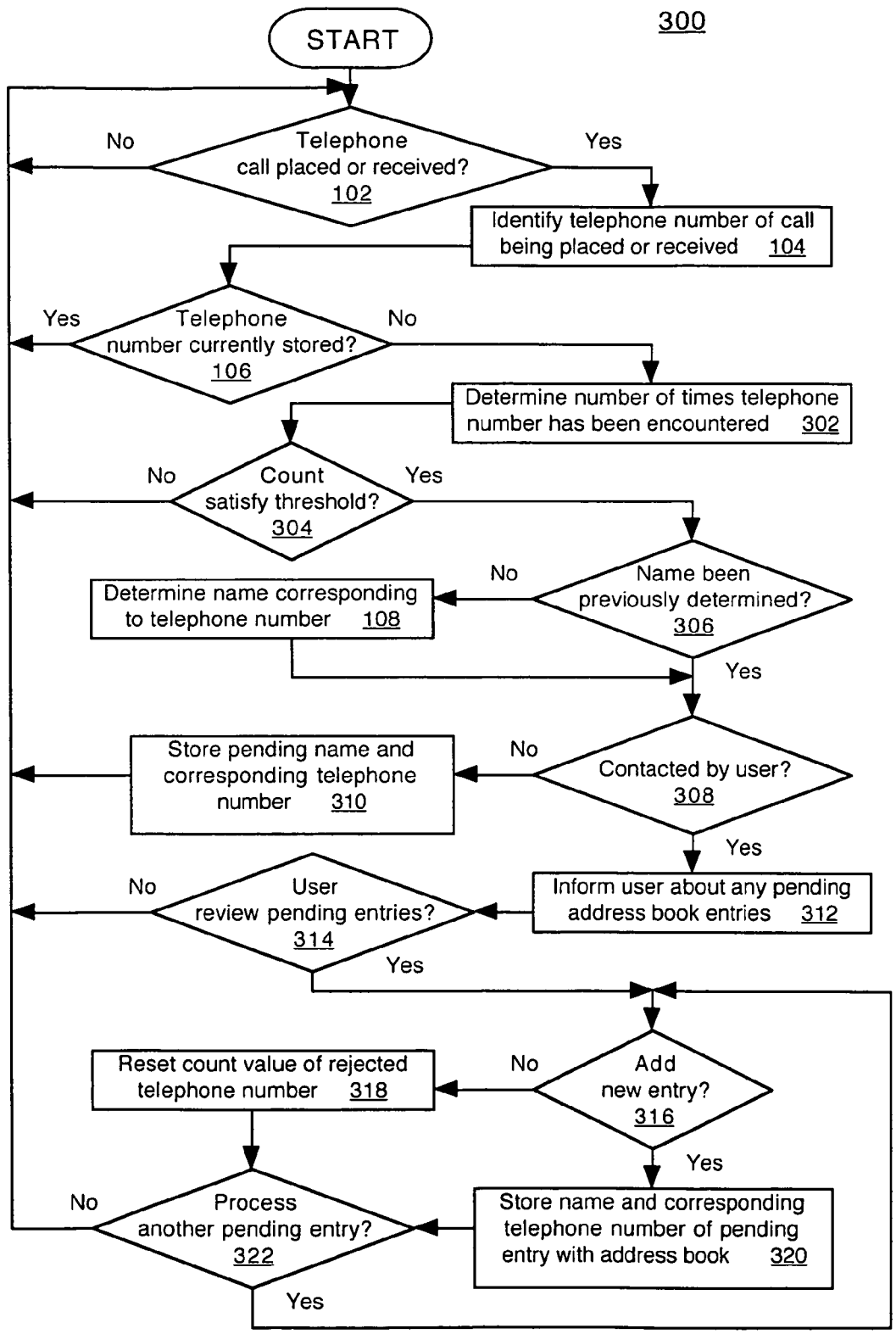
FIG. 3 is a flowchart of a method in accordance with embodiments of the invention for automatically gathering telephone numbers and their corresponding names for an electronic address book.

FIG. 3 is a flowchart of a method 300 in accordance with embodiments of the invention for automatically gathering telephone numbers and their corresponding names and then enabling a user to selectively add them to an electronic address book. Method 300 includes exemplary processes of embodiments of the invention which can be carried out by a processor(s) and electrical components under the control of computing device readable and executable instructions or code, e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 300, such operations are exemplary. That is, method 300 may not include all of the operations illustrated by FIG. 3. Additionally, method 300 may include various other operations and/or variations of the operations shown by FIG. 3. Likewise, the sequence of the operations of method 300 can be modified. It is noted that the operations of method 300 can each be performed by software, by firmware, by electronic hardware, or by any combination thereof.

Specifically, it can be determined whether a telephone call is being placed from a telephone system account or being received by that telephone system account. If not, the determination can continue. However, if a telephone call is being placed or received, the telephone number can be identified corresponding with the telephone call being placed or received. It can be determined whether the identified telephone number is currently stored. If so, method 300 can return to the determination of whether a telephone call is being placed or received. If the identified telephone number is not currently stored, the number of times the identified telephone number has been encountered can be determined.

Next within FIG. 3, it can be determined whether the determined number of times (e.g., count) that the identified telephone number was encountered satisfies a threshold value. If not, method 300 can return to the determination of whether a telephone call is being placed or received. If the threshold value is satisfied, it can be determined whether a name corresponding to the identified telephone number had been previously determined. If not, the name can be automatically determined which corresponds to the identified telephone number. If the name had been previously determined, it can be determined whether contact has been made by a user of the telephone system account. If not, the pending name and corresponding telephone number can be stored. After which, method 300 can return to determine whether a telephone call is being placed or received. If a user of the telephone system account has made contact, the user can be informed about any pending names and corresponding telephone numbers that may become new entries for an electronic address book.

It can be determined whether the user wants to review the pending address book entries. If not, method 300 returns to the determination of whether a telephone call is being placed or received. If the user wants to review the pending entries, it can be determined whether to add a particular pending address book entry to the electronic address book. If not, the count value associated with that rejected identified telephone number can be reset to a defined value. If a particular pending address book entry is to be added, the determined name and corresponding telephone number of the pending entry can be automatically stored in association with the electronic address book. It can then be determined if another pending entry for the electronic address book exists for processing. If not, method 300 returns to the determination of whether a telephone call is being placed or received. If another pending entry for the address book exists for processing, method 300 returns to the determination of whether to add that pending address book entry to the electronic address book.

Note that operations 102-108 of method 300 of FIG. 3 can be implemented in any manner similar to that described herein with reference to operations 102-108 of FIG. 1. However, at operation 106 of FIG. 3, if it is determined that the identified telephone number is not currently stored, method 300 can proceed to operation 302.

At operation 302 of FIG. 3, a determination can automatically be made as to the number of times the identified telephone number has been encountered. It is appreciated that the number of times an identified telephone number has been encountered can be referred to as a parameter associated with the telephone call. At operation 302, encountering the identified telephone number can refer to each time the telephone system account is involved with a telephone call placed to and/or received from the identified telephone number. Note that operation 302 can be implemented in a wide variety of ways. For example, the automatic determination at operation 302 can be implemented by an application utilizing a lookup table to determine if there is any count associated with the number of times the identified telephone number was encountered. In one embodiment, the automatic determination at operation 302 can include referencing any stored data associated with keeping track of the number of times the identified telephone number was encountered. Note that any technique for keeping track of the number of times that the identified telephone number was encountered can be utilized and/or referenced at operation 302.

At operation 304, a determination can automatically be made as to whether the determined number of times (e.g., a count) that the identified telephone number was encountered satisfies a threshold value. If not, method 300 can proceed to operation 102. Conversely, if the threshold value is satisfied at operation 304, method 300 can proceed to operation 306. Understand that operation 304 can be implemented in a wide variety of ways. For example, the threshold value at operation 304 can be implemented as any integer value, or as any number, but is not limited to such.

At operation 306 of FIG. 3, a determination can automatically be made as to whether a name corresponding to the identified telephone number has been previously determined. If it is determined at operation 306 that the name corresponding to the identified telephone number was not previously determined, method 300 can proceed to operation 108. Conversely, if it is determined at operation 306 that the name corresponding to the identified telephone number was previously determined, method 300 can proceed to operation 308. Operation 306 can be implemented in a wide variety of ways. For example, data associated with an electronic address book (e.g., an electronic network address book) can be referenced as part of performing the automatic determination at operation 306. In one embodiment, a database can be referenced as part of performing the automatic determination at operation 306.

It is understood that after operation 108 of FIG. 3 is completed, method 300 can proceed to operation 308. At operation 308, a determination can automatically be made as to whether contact has been made by a user of the telephone system account. If it is determined at operation 308 that a user of the telephone system account has not made contact, process 300 can proceed to operation 310. Conversely, if it is determined at operation 308 that a user of the telephone system account has made contact, process 300 can proceed to operation 312. It is appreciated that operation 308 can be implemented in diverse ways. For example, a user of the telephone system account can make contact at operation 308 when the user communicates with one or more applications associated with the telephone system related to the account. In one embodiment, a user of the telephone system account can make contact at operation 308 when the user calls in to check a voice message service associated with the telephone system account. Alternatively, a user of the telephone system account can make contact at operation 308 when the user communicates with a web interface associated with the telephone system account.

At operation 310, the pending determined name and its corresponding telephone number can be automatically stored. It is understood that operation 310 can be implemented in diverse ways. For example, the pending determined name and its corresponding telephone number can be automatically stored at operation 310 utilizing any type of electronic data storage. In one embodiment, the pending determined name and its corresponding telephone number can automatically be stored at operation 310 such that it is associated with the telephone system account utilized by the user. In one embodiment, the pending determined name and its corresponding telephone number can automatically be stored at operation 310 in a temporary manner or in a pending manner. Once operation 310 is completed, process 300 can proceed to operation 102.

At operation 312 of FIG. 3, the user can automatically be informed about any pending names and corresponding telephone numbers that may become new entries for an electronic address book. It is appreciated that operation 312 can be implemented in a wide variety of ways. For example, the user can automatically be informed at operation 312 about the pending address book entries via an audio message transmitted via telephone communication to the telephone (e.g., wireless or wire-line) utilized by the user. In an embodiment, the user can automatically be informed at operation 312 about the pending entries via text sent via telephone communication or some other communication network. In one embodiment, the user can automatically be informed at operation 312 about the pending entries via a web site interface or e-mail message.

At operation 314, a determination can automatically be made as to whether the user wants to review any pending address book entries. If it is determined at operation 314 that the user does not want to review any pending address book entries, method 300 can proceed to operation 102. Conversely, if it is determined at operation 314 that the user wants to review any pending address book entries, method 300 can proceed to operation 316. It is noted that operation 314 can be implemented in a wide variety of ways. For example, the automatic determination at operation 314 can include receiving a defined response from the user when he or she is provided an audio or text instruction to perform a particular action (e.g., press a button on his or her phone, say a specific word or phase, and the like) in order to review any pending address book entries.

At operation 316 of FIG. 3, a determination can automatically be made as to whether to add (or include) a particular pending address book entry as part of the electronic address book. If it is determined at operation 316 that a particular pending address book entry is not to be added to the electronic address book, method 300 can proceed to operation 318. However, if it is determined at operation 316 that a particular pending address book entry is to be added to the electronic address book, method 300 can proceed to operation 320. Operation 316 can be implemented in a wide variety of ways. For example, the automatic determination at operation 316 can include receiving a defined response from the user when he or she is provided an audio or text instruction for he or she to perform a particular action (e.g., press a button on his or her phone, say a specific word or phase, and the like) in order to add a pending address book entry to the electronic address book.

At operation 318, the count value (e.g., the number of times the identified telephone number was encountered) associated with the rejected identified telephone number can be automatically reset to a predefined value. It is appreciated that operation 318 can be implemented in a wide variety of ways. For example, the predefined value of operation 318 can be equal to, but is not limited to, zero, a negative integer value, a positive integer value, any number, and the like. In one embodiment, any technique for keeping track of the number of times that the identified telephone number was encounter can be automatically reset to a predefined value at operation 318.

At operation 320 of FIG. 3, if a particular pending address book entry is to be added to the electronic address book, the determined name and its corresponding telephone number of the pending entry can be automatically stored in associated with the electronic address book. Operation 320 can be implemented in a wide variety of ways. For example, the pending determined name and its corresponding telephone number can be electronically stored automatically at operation 320 as part of one or more databases associated with the electronic address book. In one embodiment, the pending determined name and its corresponding telephone number can be electronically stored automatically at operation 320 as part of an electronic network address book. The pending determined name and its corresponding telephone number can be stored automatically at operation 320 in any manner similar to that described herein, but is not limited to such. Note that once the pending determined name and its corresponding telephone number are stored, they can be accessed and utilized at some subsequent time.

At operation 322, a determination can automatically be made as to whether another pending electronic address book entry associated with the telephone system account exists for processing (or review). If it is determined at operation 322 that there is not another pending address book entry for processing, method 300 can proceed to operation 102. Conversely, if it is determined at operation 322 that there is another pending address book entry for processing, method 300 can proceed to operation 316. Note that operation 322 can be implemented in a wide variety of ways. For example, the automatic determination at operation 322 can include searching electronic data storage in order to determine if another pending address book entry associated with the telephone system account exists for processing.

In accordance with some embodiments, method 300 can be utilized to automatically gathering telephone numbers and their corresponding names and then enabling a user to selectively add them to an electronic address book. In this fashion, the user is able to specifically select which contact information is stored within the electronic address book.

Figure 4:
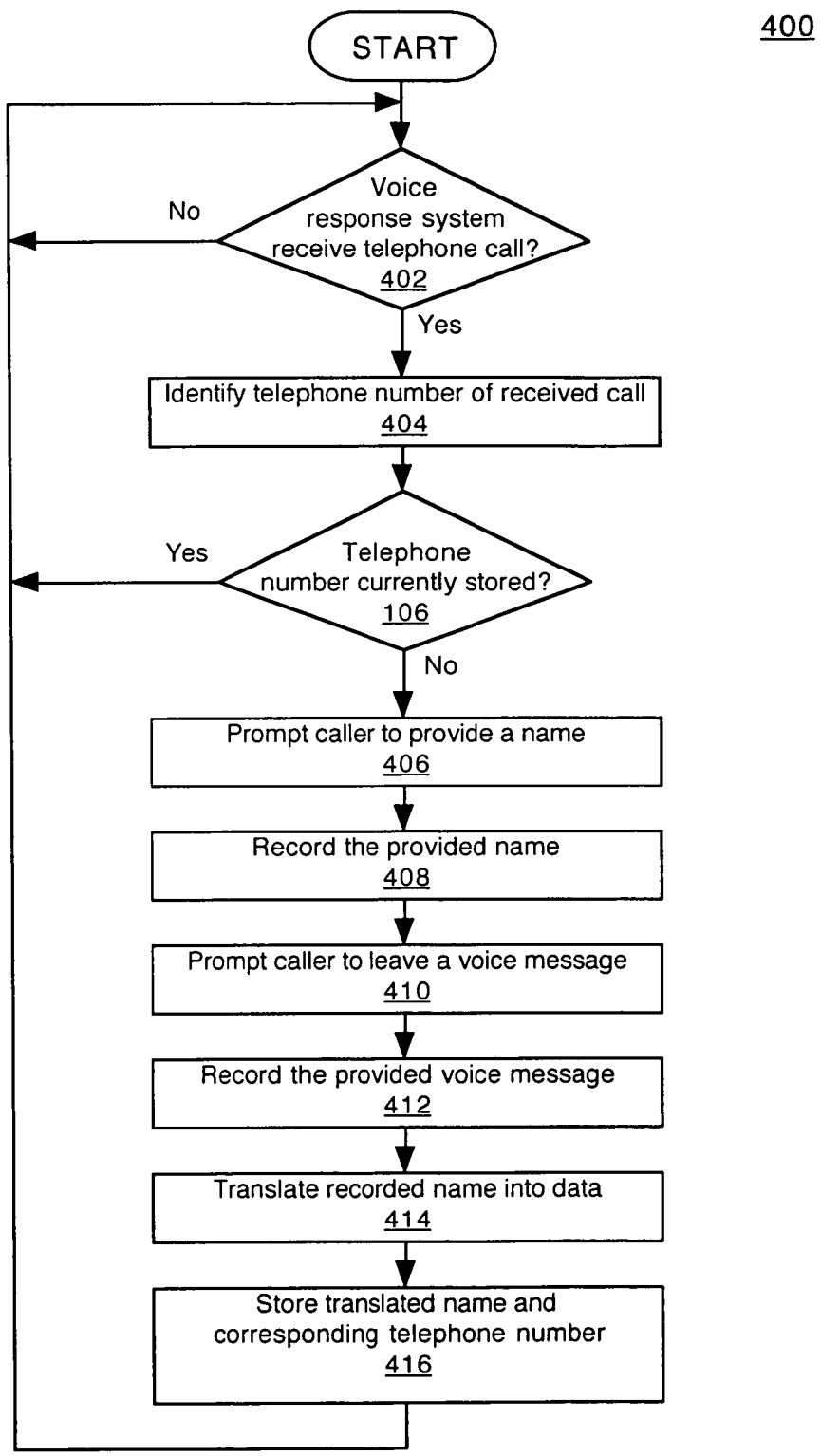
FIG. 4 is a flowchart of a method in accordance with embodiments of the invention for utilizing a voice response system to gather telephone numbers and their corresponding names.

FIG. 4 is a flowchart of a method 400 in accordance with embodiments of the invention for utilizing a voice response system to automatically gather telephone numbers and their corresponding names. Method 400 includes exemplary processes of embodiments of the invention which can be carried out by a processor(s) and electrical components under the control of computing device readable and executable instructions or code, e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 400, such operations are exemplary. That is, method 400 may not include all of the operations illustrated by FIG. 4. Additionally, method 400 may include various other operations and/or variations of the operations shown by FIG. 4. Likewise, the sequence of the operations of method 400 can be modified. It is noted that the operations of method 400 can each be performed by software, by firmware, by electronic hardware, or by any combination thereof.

Specifically, it can be determined whether a voice response system (e.g., voice mail) is receiving a telephone call or data message associated with a telephone system account. If not, the determination of whether the voice response system is receiving a telephone call or data message can be repeated. Conversely, if it is determined that the voice response system is receiving a telephone call or data message, the telephone number can automatically be identified which is associated with the received telephone call or data message. A determination can automatically be made as to whether the identified telephone number is currently stored. If so, method 400 can return to the determination of whether the voice response system is receiving a telephone call or data message. If the identified telephone number is not currently stored, the caller can be automatically prompted to provide a name audibly that can be automatically recorded. The caller can be automatically prompted to leave a voice message that can be automatically recorded. The recorded audible name can be automatically translated into data representing the name. The translated name and its corresponding telephone number can then be automatically stored.

At operation 402 of FIG. 4, a determination can automatically be made as to whether a voice response system (e.g., voice mail) is receiving a telephone call or data message associated with a telephone system account. If it is determined at operation 402 that the voice response system is not receiving a telephone call or data message associated with a telephone system account, method 400 can proceed to the beginning of operation 402. Conversely, if it is determined at operation 402 that the voice response system is receiving a telephone call or data message, method 400 can proceed to operation 404. Understand that operation 402 can be implemented in a wide variety of ways. For example, one or more applications associated with the voice response system can perform the automatic determination at operation 402. In one embodiment, the voice response system can be associated with a wireless and/or wire-line telephone system.

At operation 404, the telephone number can automatically be identified which corresponds with the received telephone call or data message. It is understood that the automatic identification of the telephone number at operation 404 can be implemented in a wide variety of ways. For example, one or more applications associated with a wireless and/or wire-line telephone system can be implemented to perform the automatic identification at operation 404 of the telephone number corresponding with the received telephone call or data message. Once operation 404 is completed, method 400 can proceed to operation 106 of FIG. 4.

Note that operation 106 of method 400 of FIG. 4 can be implemented in any manner similar to that described herein with reference to operation 106 of FIG. 1. However, at operation 106 of FIG. 4, if it is determined that the identified telephone number is currently stored, method 400 can proceed to operation 402. Conversely, if it is determined at operation 106 that the identified telephone number is not currently stored, method 400 can proceed to operation 406.

At operation 406 of FIG. 4, the caller can be automatically prompted to provide a name audibly. It is appreciated that operation 406 can be implemented in a wide variety of ways. For example, operation 406 can be performed by a voice synthesizer system or application that provides an audio prompt via telephone communication. Alternatively, operation 406 can be performed utilizing a text prompt provided via telephone communication or some other communication network.

At operation 408, the provided audible name can be automatically recorded. It is understood that operation 408 can be implemented in a wide variety of ways. For example, the provided audible name can be automatically recorded at operation 408 utilizing any type of electronic recording and/or storage technology. Note that the provided audible name can include any definition of a name as described herein, but is not limited to such.

At operation 410 of FIG. 4, the caller can be automatically prompted to leave a voice message. It is appreciated that operation 410 can be implemented in a wide variety of ways. For example, operation 410 can be performed by a voice synthesizer system or application (e.g., associated with the voice response system) that provides an audio prompt via telephone communication. Conversely, operation 410 can be performed utilizing a text prompt provided via telephone communication or some other communication network.

At operation 412, the provided voice message can be automatically recorded. It is understood that operation 412 can be implemented in a wide variety of ways. For example, the provided voice message can be automatically recorded at operation 412 utilizing any type of electronic recording and/or storage technology.

At operation 414 of FIG. 4, the recorded audible name can be automatically translated into electronic data representing the name. It is appreciated that operation 414 can be implemented in a wide variety of ways. For example, a speech recognition application (e.g., associated with the voice response system) can be utilized at operation 414 to automatically translate the recorded audible name into electronic data that represents the name.

At operation 416, the translated name and its corresponding telephone number can then be automatically stored. It is understood that operation 416 can be implemented in a wide variety of ways. For example, the translated name and its corresponding telephone number can be electronically stored automatically at operation 416 as part of a database. In one embodiment, the translated name and its corresponding telephone number can be electronically stored automatically at operation 416 in association with one or more applications (e.g., an electronic address book, an electronic organizer, an electronic network address book, and the like). The translated name and its corresponding telephone number can be automatically stored at operation 416 in any manner similar to that described herein, but is not limited to such. Note that once the translated name and its corresponding telephone number are stored at operation 416, they can be accessed and utilized at some subsequent time. Once operation 416 is completed, process 400 can proceed to operation 402.

In accordance with some embodiments, method 400 can be utilized together with a voice response system (e.g., voice mail) to automatically gather and store telephone numbers and their corresponding names. In this manner, a user of the telephone system account does not have to exert much, if any, effort for his or her electronic address book to be populated with telephone numbers and their corresponding names.

Figure 5:
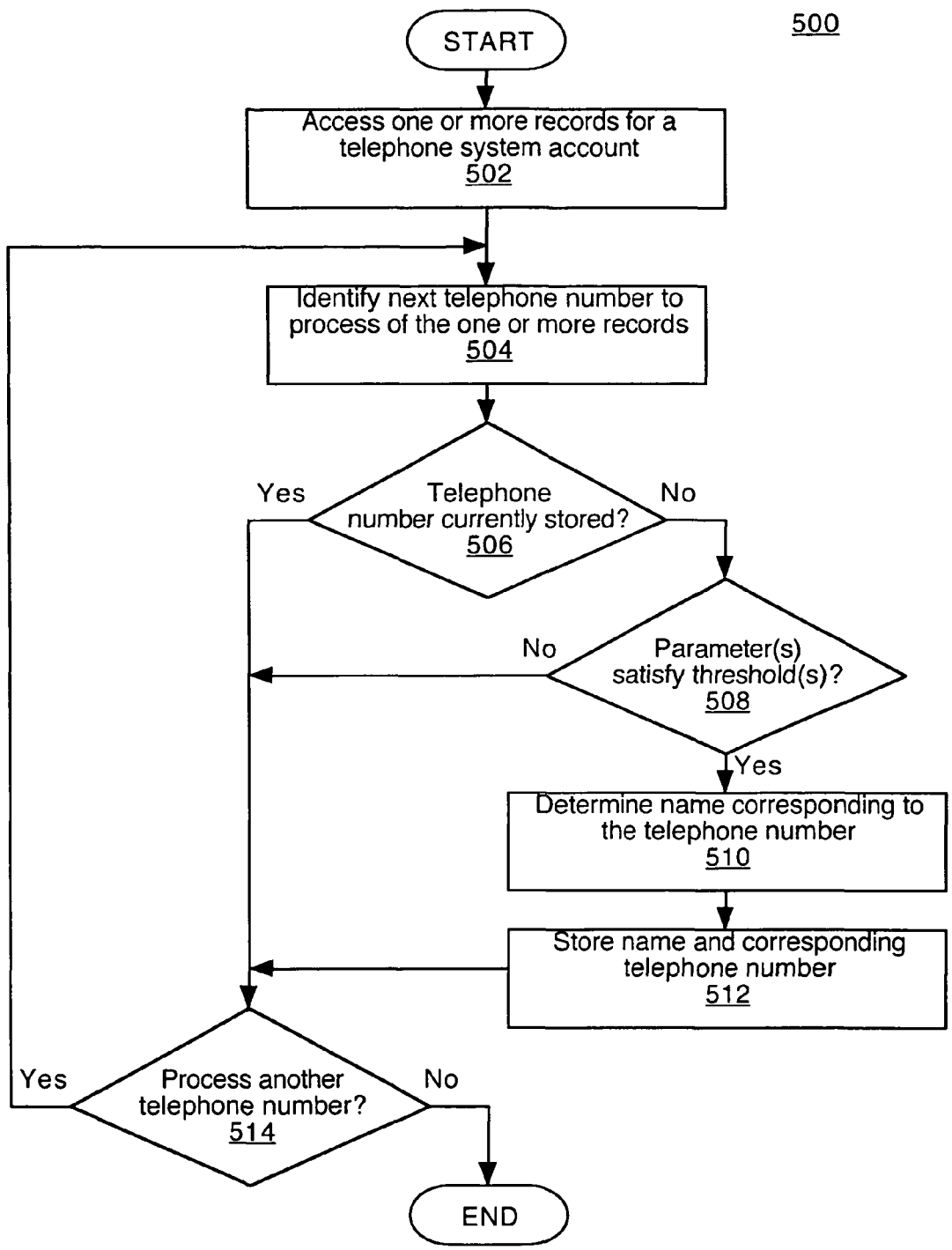
FIG. 5 is a flowchart of another method in accordance with embodiments of the invention for automatically gathering and storing telephone numbers and their corresponding names.

FIG. 5 is a flowchart of a method 500 in accordance with embodiments of the invention for automatically gathering and storing telephone numbers and their corresponding names. Method 500 includes exemplary processes of embodiments of the invention which can be carried out by a processor(s) and electrical components under the control of computing device readable and executable instructions or code, e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 500, such operations are exemplary. That is, method 500 may not include all of the operations illustrated by FIG. 5. Additionally, method 500 may include various other operations and/or variations of the operations shown by FIG. 5. Likewise, the sequence of the operations of method 500 can be modified. It is noted that the operations of method 500 can each be performed by software, by firmware, by electronic hardware, or by any combination thereof.

Specifically, one or more records can be accessed that are associated with a telephone system account. The next telephone number to process of the records can be identified. It can be determined whether the identified telephone number is currently stored. If so, a first determination can be performed which will be described below. Conversely, if the identified telephone number is not currently stored, a determination can be made as to whether a parameter associated with the identified telephone number satisfies a threshold. If not, the first determination can be performed. However, if the parameter associated with the identified telephone number satisfies the threshold, the name can automatically be determined which corresponds to the identified telephone number. The determined name and its corresponding telephone number can then be automatically stored. The first determination can involve determining whether there is another telephone number to process within the records. If so, method 500 returns to identify the next telephone number to process within the records. However, if there is not another telephone number to process, method 500 can be ended.

At operation 502 of FIG. 5, one or more records can be automatically accessed that are associated with a telephone system account (e.g., wireless and/or wire-line). It is understood that operation 502 can be implemented in a wide variety of ways. For example, the records can include, but are not limited to, telephone call detail records, telephone usage invoices, historical telephone call records, any type of telephone call records, data message records, voice and data services usage records, any type of communication records, or any combination thereof. Note that the one or more records at operation 502 can be electronically accessible and/or electronically stored. In one embodiment, an application can automatically access one or more records at operation 502 that are associated with the telephone system account.

At operation 504, the next telephone number to process within the one or more records can be automatically identified. It is noted that operation 504 can be implemented in a wide variety of ways. For example, the next telephone number can be automatically identified at operation 504 by a sequential order, a random order, or any other technique for choosing a telephone number in a record.

At operation 506 of FIG. 5, a determination can automatically be made as to whether the identified telephone number is currently stored. If so, process 500 can proceed to operation 514. However, if it is determined that the identified telephone number is not currently stored, process 500 can proceed to operation 508. It is understood that operation 506 can be implemented in a wide variety of ways. For example, operation 506 can involve searching one or more applications associated with a specific telephone system account (e.g., wireless and/or wire-line) to automatically determine whether the identified telephone number is currently stored by one or more electronic data storage devices. Additionally, one of the applications associated with a specific telephone system account at operation 506 may be an electronic address book. The electronic address book can include contact information such as, but not limited to, names, telephone numbers, street addresses, e-mail (electronic mail) addresses, and the like. Furthermore, the electronic address book can be an electronic network address book.

At operation 508, a determination can automatically be made as to whether a parameter associated with the identified telephone number satisfies a threshold. If the parameter associated with the identified telephone number fails to satisfy the threshold at operation 508, method 500 can proceed to operation 514. However, if the parameter associated with the identified telephone number satisfies the threshold, method 500 can proceed to operation 510. It is noted that operation 508 can be implemented in a wide variety of ways. For example, the automatic determination at operation 508 can include one or more parameters along with one or more thresholds. The one or more parameters along with the one or more thresholds associated with the identified telephone number at operation 508 can each be implemented in a wide variety of ways.

For example, a parameter associated with the telephone number can include, but is not limited to, the number of times the telephone number appears in the one or more records, the number of times the telephone number appears as a dialed and/or placed call in the one or more records, the number of times the telephone number appears as a received call in the one or more records, the duration associated with a telephone call placed to and/or received from the identified telephone number in the one or more records, the number of times a telephone call is placed to and/or received from the identified telephone number within a specific time period (e.g., a day, a week, a month, a year, or any defined time period) in the one or more records, and/or if the identified telephone number corresponds to a wireless or a wire-line telephone system. Note that depending on how a parameter is defined for operation 508, a corresponding threshold can be defined. It is appreciated that the automatic determination at operation 508 can be implemented in any manner similar to that described herein, but is not limited to such.

At operation 510, the name can automatically be determined that corresponds to the identified telephone number. Operation 510 can be implemented in a wide variety of ways. For example, one or more databases can be utilized at operation 510 to perform a lookup (e.g., reverse lookup) to automatically determine the name corresponding to the identified telephone number. Note that the database at operation 510 can be implemented in any manner similar to that described herein, but is not limited to such. The name corresponding to a telephone number at operation 510 can be implemented in any manner similar to that described herein, but is not limited to such.

At operation 512 of FIG. 5, the determined name and its corresponding telephone number can be automatically stored. The automatic storing at operation 512 can be implemented in a wide variety of ways. For example, the determined name and its corresponding telephone number can be electronically stored automatically at operation 512 as part of a database. In one embodiment, the determined name and its corresponding telephone number can be electronically stored automatically at operation 512 in association with one or more applications (e.g., an electronic address book, an electronic organizer, an electronic network address book, and the like). The determined name and its corresponding telephone number can be stored automatically at operation 512 in any manner similar to that described herein, but is not limited to such. Note that once the determined name and its corresponding telephone number are stored at operation 512, they can be accessed and utilized at some subsequent time.

At operation 514, a determination can automatically be made as to whether there is another telephone number to process of the one or more records. If it is determined that there is another telephone number to process at operation 514, method 500 can proceed to operation 504. However, if there is not another telephone number to process, method 500 can be ended. It is noted that operation 514 can be implemented in a wide variety of ways. For example, the automatic determination at operation 514 can include referencing electronic stored data and/or the one or more records.

In accordance with some embodiments, method 500 can utilize one or more records associated with a telephone system account to automatically and selectively populate an electronic address book with telephone numbers along with their corresponding names. In this fashion, a user of the telephone system account does not have to exert much (if any) effort for his or her electronic address book to be populated with telephone numbers and their corresponding names. Furthermore, the amount of undesirable contact information stored within the electronic address book can be reduced.

Figure 6:
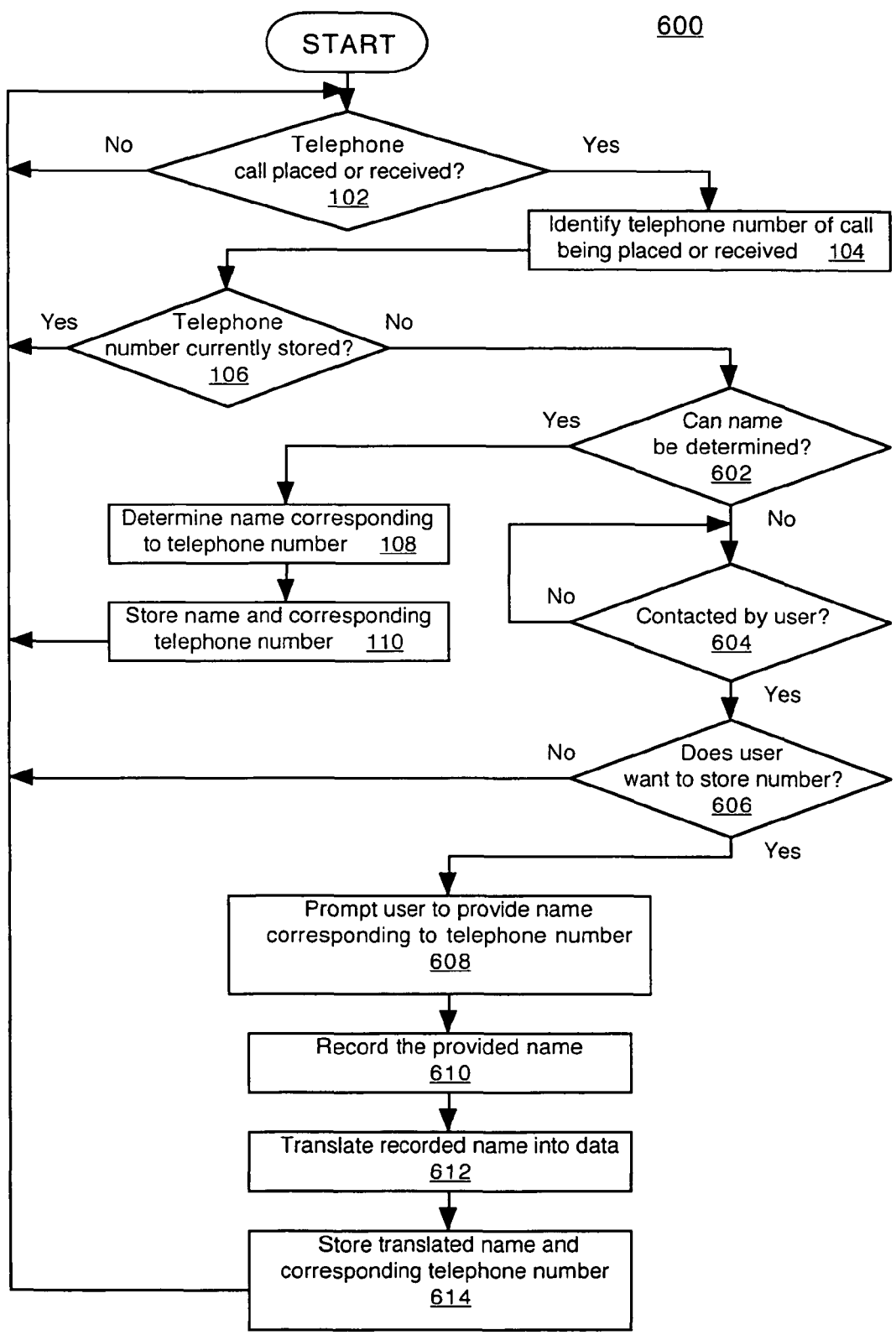
FIG. 6 is a flowchart of yet another method in accordance with embodiments of the invention for automatically gathering telephone numbers and their corresponding names.

FIG. 6 is a flowchart of a method 600 in accordance with embodiments of the invention for automatically gathering telephone numbers and their corresponding names and also enabling a user to provide names that cannot be determined. Method 600 includes exemplary processes of embodiments of the invention which can be carried out by a processor(s) and electrical components under the control of computing device readable and executable instructions or code, e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 600, such operations are exemplary. That is, method 600 may not include all of the operations illustrated by FIG. 6. Additionally, method 600 may include various other operations and/or variations of the operations shown by FIG. 6. Likewise, the sequence of the operations of method 600 can be modified. It is noted that the operations of method 600 can each be performed by software, by firmware, by electronic hardware, or by any combination thereof.

Specifically, it can be determined whether a telephone call is being placed from a telephone system account or being received by that telephone system account. If not, the determination can continue. However, if a telephone call is being placed or received, the telephone number can be identified corresponding with the telephone call being placed or received. It can be determined whether the identified telephone number is currently stored. If so, method 600 can return to the determination of whether a telephone call is being placed or received. If the identified telephone number is not currently stored, it can be determined whether a name corresponding to the identified telephone number can be determined. If so, the name can be automatically determined which corresponds to the identified telephone number. The determined name and corresponding telephone number can then be stored. After which, method 600 method 600 can return to the determination of whether a telephone call is being placed or received. However, if a name corresponding to the identified telephone number cannot be determined, it can be determined whether contact has been made by a user of the telephone system account. If not, that determination can continue. If a user of the telephone system account makes contact, it can be determined whether the user desires to store the identified telephone number. If not, method 600 can return to the determination of whether a telephone call is being placed or received. However, if the user desires to store the identified telephone number, the user can be automatically prompted to audibly provide a name that corresponds to the identified telephone number which can be automatically recorded. The recorded audible name can be automatically translated into data representing the name. The translated name and its corresponding telephone number can then be automatically stored.

Note that operations 102-106 of method 600 of FIG. 6 can be implemented in any manner similar to that described herein with reference to operations 102-106 of FIG. 1. However, at operation 106 of FIG. 6, if it is determined that the identified telephone number is not currently stored, method 600 can proceed to operation 602.

At operation 602 of FIG. 6, a determination can automatically be made as to whether a name corresponding to the identified telephone number can be determined or ascertained. If so, method 600 can proceed to operation 108 of FIG. 6. However, if it is determined at operation 602 that a name corresponding to the identified telephone number cannot be determined or ascertained, method 600 can proceed to operation 604. Operation 602 can be implemented in a wide variety of ways. For example, one or more databases can be accessed at operation 602 in order to automatically determine if a name corresponds to the identified telephone number. It is understood that the one or more databases of this embodiment can be implemented in any manner similar to that described herein.

Note that operations 108 and 110 of method 600 of FIG. 6 can be implemented in any manner similar to that described herein with reference to operations 108 and 110 of FIG. 1.

At operation 604 of FIG. 6, a determination can automatically be made as to whether contact has been made by a user of the telephone system account. If it is determined at operation 604 that a user of the telephone system account has not made contact, process 600 can repeat operation 604. Conversely, if it is determined at operation 604 that a user of the telephone system account has made contact, process 600 can proceed to operation 606. Operation 604 can be implemented in diverse ways. For example, a user of the telephone system account can make contact at operation 604 when the user communicates with one or more applications associated with the telephone system related to the account. In one embodiment, a user of the telephone system account can make contact at operation 604 when the user calls in to check a voice message service associated with the telephone system account. Alternatively, a user of the telephone system account can make contact at operation 604 when the user communicates with a web interface associated with the telephone system account.

At operation 606, a determination can automatically be made as to whether the user desires to store the identified telephone number. If not, method 600 can proceed to operation 102. However, if it is determined at operation 606 that the user desires to store the identified telephone number, method 600 can proceed to operation 608. Note that operation 606 can be implemented in a wide variety of ways. For example, the automatic determination at operation 606 can include receiving a defined response from the user when he or she is provided an audio or text instruction to perform a particular action (e.g., press a button on his or her phone, say a specific word or phase, and the like) in order to store the identified telephone number.

At operation 608 of FIG. 6, the user can be automatically prompted to audibly provide a name that corresponds to the identified telephone number. Operation 608 can be implemented in a wide variety of ways. For example, operation 608 can be performed by a voice synthesizer system or application that provides an audio prompt via telephone communication. Alternatively, operation 608 can be performed utilizing a text prompt provided via telephone communication or some other communication network.

At operation 610, the provided audible name can be automatically recorded. Operation 610 can be implemented in a wide variety of ways. For example, the provided audible name can be automatically recorded at operation 610 utilizing any type of electronic recording and/or storage technology. Note that the provided audible name can include any definition of a name as described herein, but is not limited to such.

At operation 612 of FIG. 6, the recorded audible name can be automatically translated into electronic data representing the name. Operation 612 can be implemented in a wide variety of ways. For example, a speech recognition application (e.g., associated with the telephone system) can be utilized at operation 612 to automatically translate the recorded audible name into electronic data that represents the name.

At operation 614, the translated name and its corresponding telephone number can then be automatically stored. Operation 614 can be implemented in a wide variety of ways. For example, the translated name and its corresponding telephone number can be electronically stored automatically at operation 614 as part of a database. In one embodiment, the translated name and its corresponding telephone number can be electronically stored automatically at operation 614 in association with one or more applications (e.g., an electronic address book, an electronic organizer, an electronic network address book, and the like). The translated name and its corresponding telephone number can be automatically stored at operation 614 in any manner similar to that described herein, but is not limited to such. Note that once the translated name and its corresponding telephone number are stored at operation 614, they can be accessed and utilized at some subsequent time. Once operation 614 is completed, process 600 can proceed to operation 102.

In accordance with some embodiments, method 600 can be utilized to automatically gathering and store telephone numbers and their corresponding names. However, if a corresponding name cannot be determined for an identified telephone number, method 600 can enable a user to provide a name corresponding to that number when the user desires to store that telephone number. In this fashion, a user of the telephone system account does not have to exert much, if any, effort for his or her electronic address book to be populated with telephone numbers and their corresponding names.

Figure 7:
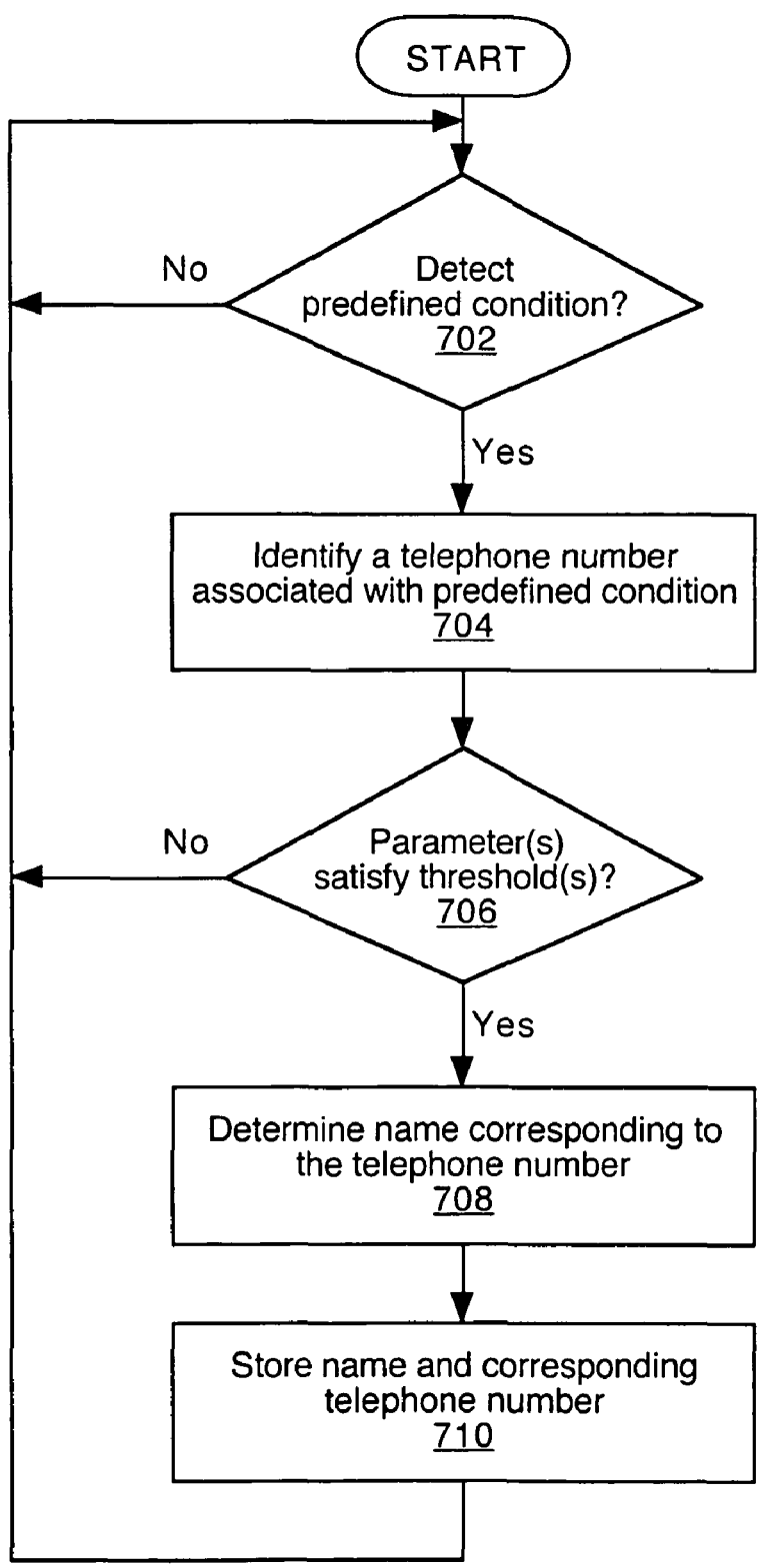
FIG. 7 is a flowchart of yet another method in accordance with embodiments of the invention for automatically and selectively gathering and storing telephone numbers and their corresponding names.

FIG. 7 is a flowchart of a method 700 in accordance with embodiments of the invention for automatically gathering and storing telephone numbers and their corresponding names based on one or more parameters. Method 700 includes exemplary processes of embodiments of the invention which can be carried out by a processor(s) and electrical components under the control of computing device readable and executable instructions or code, e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 700, such operations are exemplary. That is, method 700 may not include all of the operations illustrated by FIG. 7. Additionally, method 700 may include various other operations and/or variations of the operations shown by FIG. 7. Likewise, the sequence of the operations of method 700 can be modified. It is noted that the operations of method 700 can each be performed by software, by firmware, by electronic hardware, or by any combination thereof.

Specifically, a determination can automatically be made as to whether a predefined condition is detected. If not, the determination can continue. However, if the predefined condition is detected, a telephone number can automatically be identified that is associated with the predefined condition. A determination can automatically be made as to whether a parameter associated with the telephone number satisfies a threshold. If not, method 700 can return to the automatic determination of whether the predefined condition is detected. However, if the parameter associated with the telephone number satisfies the threshold, a name can automatically be determined which corresponds to the identified telephone number. The determined name and its corresponding telephone number can then be automatically stored.

At operation 702 of FIG. 7, a determination can automatically be made as to whether a predefined condition is detected. If not, method 700 proceeds to the beginning of operation 702 to repeat it. If the predefined condition is detected at operation 702, method 700 proceeds to operation 704. Operation 702 can be implemented in a wide variety of ways. For example, a predefined condition can be an occurrence of an incoming and/or an outgoing telephone call as described herein, but not limited to such. Additionally, a predefined condition can be an occurrence of an incoming and/or an outgoing data message (e.g., text message, facsimile message, and the like) associated with a telephone system account. Furthermore, a predefined condition can be an occurrence of an incoming and/or an outgoing electronic mail message associated with a telephone system account. A predefined condition can be an occurrence of any type of communication associated with one or more telephone system accounts.

At operation 704, a telephone number can automatically be identified that is associated with the predefined condition. Operation 704 can be implemented in a wide variety of ways. For example, automatically identifying a telephone number associated with the predefined condition at operation 704 can be implemented in any manner similar to that described herein, but not limited to such. Additionally, in one embodiment, an automated system or application can analyzes an incoming electronic mail message associated with a telephone system account at operation 704 to identify a telephone number associated with the sender of the incoming electronic mail message. In another embodiment, an automated system or application can analyzes an outgoing electronic mail message associated with a telephone system account at operation 704 to identify a telephone number associated with the intended recipient of the outgoing electronic mail message. In yet another embodiment, an automated system or application can analyzes an incoming or outgoing electronic mail message associated with a telephone system account at operation 704 to identify a telephone number associated with the electronic mail message, as described above.

At operation 706 of FIG. 7, a determination can automatically be made as to whether a parameter associated with the telephone number satisfies a threshold. If not, method 700 can proceed to operation 702. However, if the parameter associated with the telephone number satisfies the threshold at operation 706, process 700 proceeds to operation 708. Note that operation 706 can be implemented in a wide variety of ways. For example, the automatic determination at operation 706 can include one or more parameters along with one or more thresholds. It is appreciated that the one or more parameters along with the one or more thresholds at operation 706 can each be implemented in any manner similar to that described herein, but is not limited to such.

At operation 708, a name can automatically be determined which corresponds to the identified telephone number. Operation 708 can be implemented in a wide variety of ways. For example, the automatic determination of a name corresponding to the identified telephone number at operation 708 can be implemented in any manner similar to that described herein, but is not limited to such.

At operation 710 of FIG. 7, the determined name and its corresponding telephone number can be automatically stored. It is understood that operation 710 can be implemented in a wide variety of ways. For example, the automatic storing of the determined name and its corresponding telephone number at operation 710 can be implemented in any manner similar to that described herein, but is not limited to such. Furthermore, in one embodiment, at operation 710, the determined name, its corresponding telephone number and any other pertinent information can be automatically stored (e.g., in association with an electronic address book, an electronic organizer, an electronic network address book, and/or the like). Once operation 710 is completed, method 700 can proceed to operation 702.

In accordance with some embodiments, method 700 can be utilized to automatically and selectively populate an electronic address book associated with a telephone system account with telephone numbers along with their corresponding names. In this fashion, a user of the telephone system account does not have to exert much, if any, effort for his or her electronic address book to be populated with telephone numbers and their corresponding names.

Figure 8:
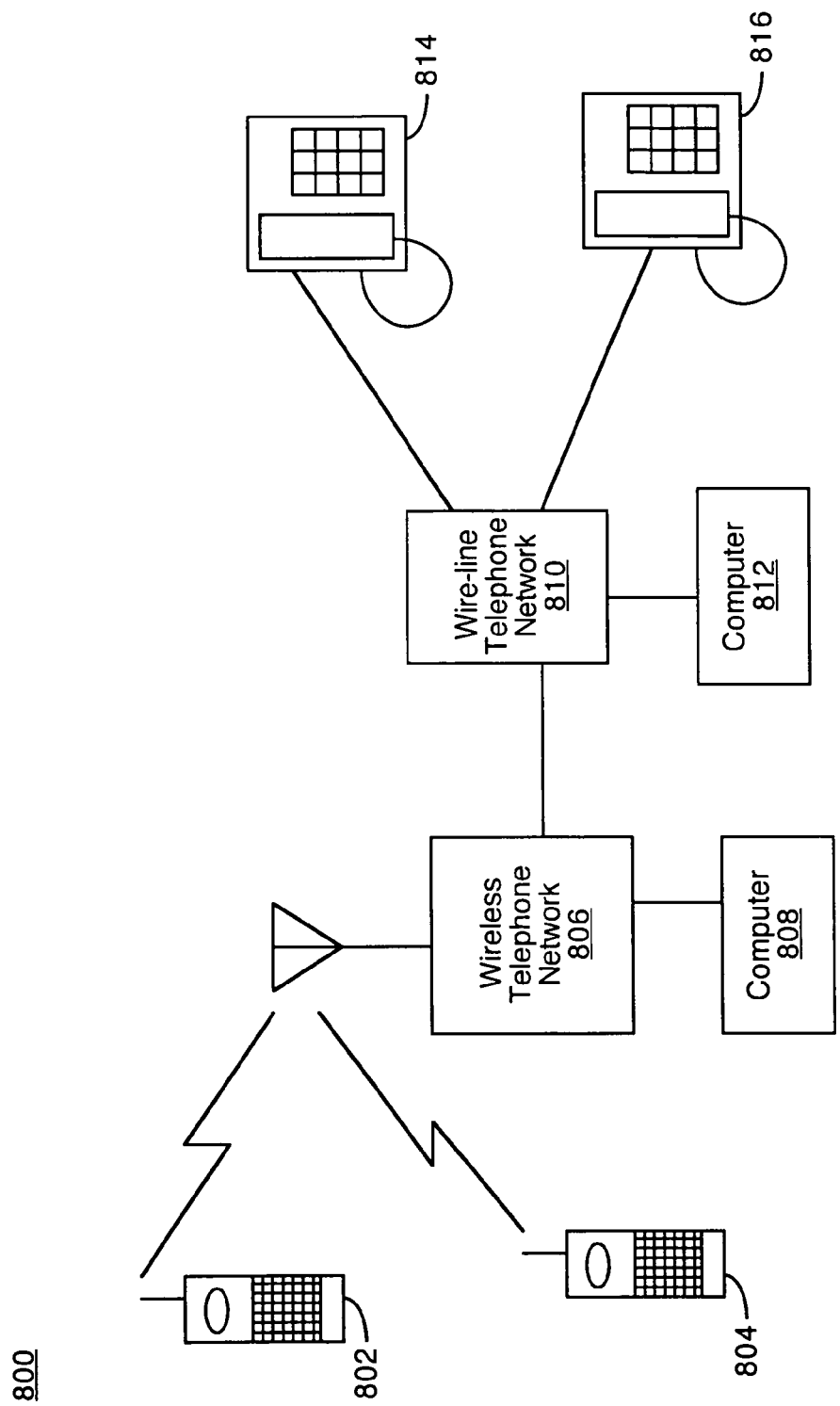
FIG. 8 is a block diagram of an exemplary communication environment in accordance with embodiments of the invention.

FIG. 8 is a block diagram of an exemplary communication environment 800 in accordance with embodiments of the invention. It is understood that methods in accordance with embodiments (e.g., 100, 200, 300, 400, 500, 600, and/or 700) of the invention can be utilized in combination with communication environment 800. In its various implementations, communication environment 800 may not include all of the elements illustrated by FIG. 8, or communication environment 800 may include other elements not shown by FIG. 8.

Communication environment 800 can include a wireless telephone network 806 that can be coupled via one or more wireless communication technologies with wireless telephone handsets 802 and 804. As such, telephone handsets 802 and 804 can each transmit and receive voice information along with other types of data via wireless technology. Note that a computer 808 can be coupled with wireless telephone network 806 and can perform one or more operations in accordance with embodiments of the invention.

Additionally, communication environment 800 of FIG. 8 can include a wire-line telephone network 810 that can be coupled via one or more wire-line communication technologies with wire-line telephones 814 and 816. Therefore, wire-line telephones 814 and 816 can each transmit and receive voice information along with other types of data via wire-line technology. Note that a computer 812 can be coupled with wire-line telephone network 810 and can perform one or more operations in accordance with embodiments of the invention.

Within communication environment 800, wireless telephone network 806 and wire-line telephone network 810 can be communicatively coupled together. In this manner, telephone handsets 802 and 804 can each communicate with wire-line telephone network 810, computer 812, along with wire-line telephones 814 and 816. Conversely, telephones 814 and 816 can each communicate with wireless telephone network 806, computer 808, along with wireless telephones 802 and 804. It is appreciated that telephone handsets 802 and 804, telephones 814 and 816, wireless telephone network 806, and wire-line telephone network 810 can each perform one or more operations in accordance with embodiments of the invention.

Within FIG. 8, communication environment 800 can include a greater or fewer number of wireless telephone handsets (e.g., 802 and 804) than that shown. Additionally, communication environment 800 can include a greater or fewer number of wire-line telephones (e.g., 814 and 816) than that shown. A greater or fewer number of computers (e.g., 808 or 812) can be coupled with wireless telephone network 806 and wire-line telephone network 810 than that shown. It is understood that communication environment 800 can include a greater or fewer number of wireless telephone networks (e.g., 806) than that shown. Furthermore, communication environment 800 can include a greater or fewer number of wire-line telephone networks (e.g., 810) than that shown.

Note that telephone handsets 802 and 804, computers 808 and 812, along with wire-line telephones 814 and 816 can each be implemented in a manner similar to computer system 900, described below. Moreover, wireless telephone network 806 and wire-line telephone network 810 can each be implemented to include one or more computer systems similar to computer system 900.

Figure 9:
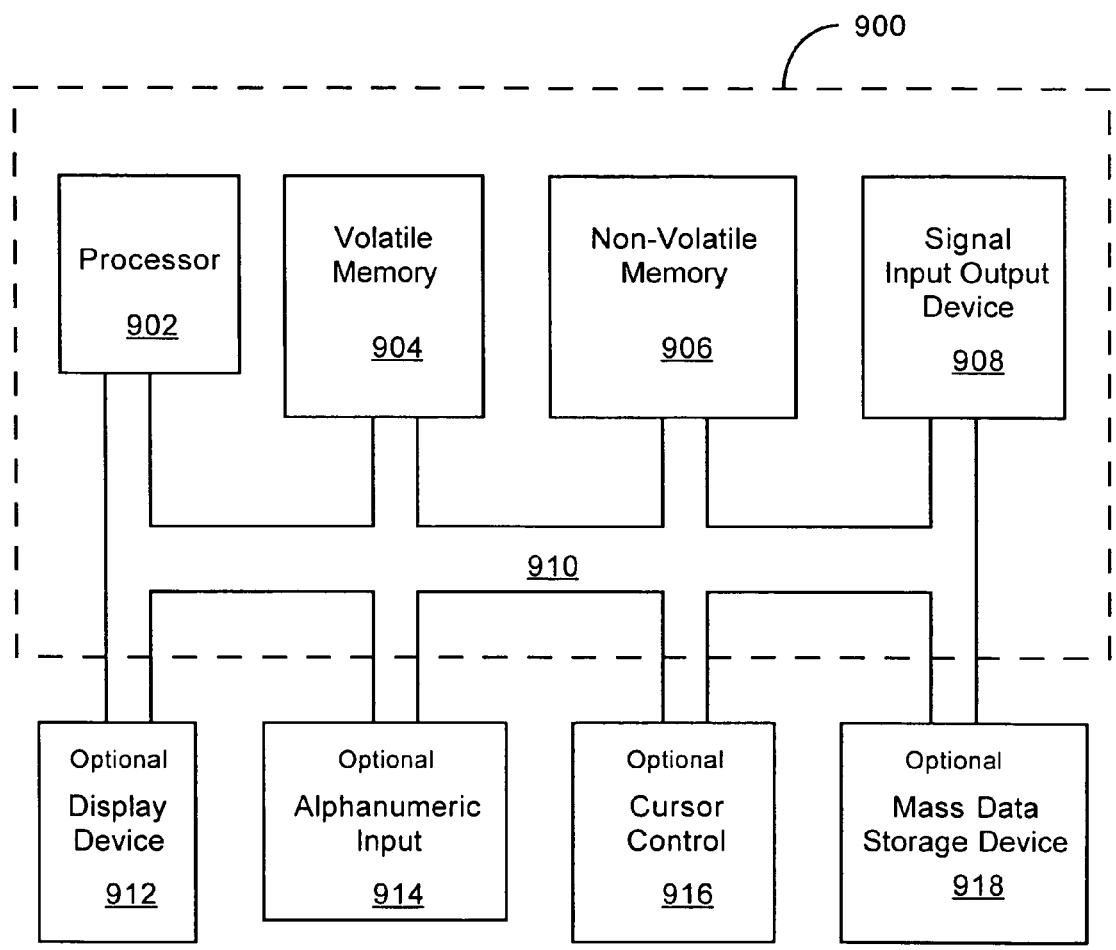
FIG. 9 is a block diagram of an exemplary computer system in accordance with embodiments of the invention.

FIG. 9 is a block diagram of an exemplary computer system 900 in accordance with embodiments of the invention. It is understood that system 900 is not strictly limited to be a computer system. As such, system 900 is well suited to be any type of computing device (e.g., server computer, desktop computer, laptop computer, portable computing device, database computer, and the like). Note that computer system 900 can be utilize to implement any type of computing device mentioned herein with reference to embodiments in accordance with the invention. In its various implementations, system 900 may not include all of the elements illustrated by FIG. 9, or system 900 may include other elements not shown by FIG. 9. Within the discussions of embodiments in accordance with the invention herein, certain processes and operations were discussed that may be realized, in some embodiments, as a series of instructions (e.g., software program) that reside within computing device readable memory of computer system 900 and executed by a processor(s) of system 900. When executed, the instructions can cause computer 900 to perform specific operations and exhibit specific behavior which are described herein.

Computer system 900 comprises an address/data bus 910 for communicating information, one or more central processors 902 coupled with bus 910 for processing information and instructions. Central processor unit(s) 902 may be a microprocessor or any other type of processor or controller. The computer 900 can also include data storage features such as computer usable volatile memory 904, e.g., random access memory (RAM), static RAM, dynamic RAM, etc., coupled with bus 910 for storing information and instructions for central processor(s) 902, computer usable non-volatile memory 906, e.g., read only memory (ROM), programmable ROM, flash memory, erasable programmable read only memory (EPROM), electrically erasable programmable read only memory (EEPROM), etc., coupled with bus 910 for storing static information and instructions for processor(s) 902.

System 900 of FIG. 9 can also include one or more signal generating and receiving devices 908 coupled with bus 910 for enabling system 900 to interface with other electronic devices. The communication interface(s) 908 can include one or more wired and/or wireless communication technologies. For example, in one embodiment, the communication interface 908 is a serial communication port, but could also alternatively be any of a number of well known communication standards and protocols, e.g., a Universal Serial Bus (USB), an Ethernet adapter, a FireWire (IEEE 1394) interface, a parallel port, a small computer system interface (SCSI) bus interface, an infrared (IR) communication port, a Bluetooth wireless communication adapter, a broadband connection, and the like. In another embodiment, a cable or digital subscriber line (DSL) connection may be employed. In such a case, the communication interface(s) 908 may include a cable modem or a DSL modem.

Optionally, computer system 900 can include an alphanumeric input device 914 including alphanumeric and function keys coupled to the bus 910 for communicating information and command selections to the central processor(s) 902. The computer 900 can also include an optional cursor control or cursor directing device 916 coupled to the bus 910 for communicating user input information and command selections to the processor(s) 902. The cursor directing device 916 can be implemented using a number of well known devices such as, but not limited to, a mouse, a track ball, a track pad, an optical tracking device, a touch screen, etc. Alternatively, it is appreciated that a cursor can be directed and/or activated via input from the alphanumeric input device 914 using special keys and key sequence commands. The present embodiment is also well suited to directing a cursor by other means such as, for example, voice commands.

The system 900 of FIG. 9 can also include an optional computer usable mass data storage device 918 such as a magnetic or optical disk and disk drive (e.g., hard drive or floppy diskette) coupled with bus 910 for storing information and instructions. An optional display device 912 can be coupled to bus 910 of system 900 for displaying video and/or graphics. It should be appreciated that optional display device 912 can be a cathode ray tube (CRT), flat panel liquid crystal display (LCD), field emission display (FED), plasma display or any other display device suitable for displaying video and/or graphic images and alphanumeric characters recognizable to a user.

The components associated with system 900 described above may be resident to and associated with one physical computing device. However, one or more of the components associated with system 900 may be physically distributed to other locations and be communicatively coupled together (e.g., via a network).

Therefore, embodiments in accordance with the invention can be utilized to automatically populate an electronic address book with telephone numbers and their corresponding names. Depending on the embodiment in accordance with the invention, a user of a telephone system account does not have to exert much (or any) effort for his or her electronic address book to be populated with telephone numbers and their corresponding names.

The foregoing descriptions of specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A method for electronically populating an address book with a telephone number associated with an incoming call to a computing device or an outgoing call from the computing device, the method, comprising:
   identifying a telephone number associated with the incoming call received via an account or the outgoing telephone call placed via the account using the computing device;
   wherein, the account is associated with a user of the computing device;
   determining whether the user has made contact using the telephone number associated with the incoming or outgoing telephone call;
   wherein, the contact is determined to have been made when the user communicates using applications associated with the account of the user;
   wherein, the applications include a web interface associated with the account and a voice message service associated with the account;
   informing the user that the telephone number is pending to become a new entry in the address book;
   determining whether the user wants to review the telephone number that is pending;
   electronically storing the telephone number in the address book in response to receiving a response from the user to add the telephone number as the new entry.

2. The method as described in claim 1, wherein, the user is informed that the telephone number is pending via an audio message transmitted via telephone communication to the computing device.

3. The method as described in claim 2,
   automatically determining whether a name corresponding to the telephone number is automatically identifiable;
   in response to determining that the name that corresponds to the telephone number is not automatically identifiable, prompting the user of the computing device to provide the name that corresponds to the telephone number;
   wherein, the prompting comprises providing an audible prompt or text prompt to the user of the computing device to provide the name.

4. The method as described in claim 1, further comprising, automatically determining whether a parameter associated with the incoming or outgoing call satisfies a threshold; wherein the parameter comprises a number of times the telephone number has been encountered by the account.

5. The method as described in claim 3, further comprising, recording audible data provided by the user in response to the audible prompt; automatically translating the audible data into the name associated with the telephone number.

6. A method of populating an address book using a set of communication records, the set of communication records generated from communications that occurred with an account using a computing device, the method, comprising:
   accessing a communication record from the set of communication records that are associated with the account;
   wherein the set of communication records comprises a voice service and data service usage record;
   automatically identifying, by the computing device, a telephone number associated with the communication record;
   determining a name that corresponds to the telephone number;
   determining whether a user associated with the account has made contact using the telephone number associated with the communication record;
   wherein, the contact is determined to have been made when the user communicates using applications associated with the account of the user;
   wherein, the applications include a web interface associated with the account and a voice message service associated with the account;
   informing the user that there is the telephone number is pending to become a new entry in the address book;
   prompting the user whether the user wants to add the new telephone number as the new entry, in response to determining that the user wants to review the telephone number that is pending;
   receiving a response from the user to add the new telephone number as the new entry,
   electronically storing the telephone number in the address book.

7. The method as described in claim 6, wherein the set of communication records further comprises one or more of a historical call record and a usage invoice.

8. The method as described in claim 6, wherein the set of communication records comprises a data message record.

9. The method as described in claim 6, further comprising:
   automatically accessing a second communication record of the set of communication records;
   wherein, the second communication record is accessed in a sequential or random order.

10. The method as described in claim 6, further comprising:
    determining automatically whether a parameter associated with the telephone number satisfies a threshold.

11. The method as described in claim 6, wherein the parameter comprises a number of times the telephone number exists within the set of communication records.

12. The method as described in claim 6, wherein the parameter comprises a duration of a telephone call corresponding to the telephone number.

13. The method as described in claim 9, further comprising,
automatically identifying the second telephone number of the second communication record of the set of communication records;
determining a second name that corresponds to the second telephone number; and
electronically storing the second name and the second telephone number in the address book.

14. A method for electronically populating an address book responsive to an occurrence, on a computing device, of an event associated with a predefined condition, the method, comprising:
detecting the occurrence of the event associated with the predefined condition on the computing device,
the event comprising an outgoing or incoming text message associated with an account;
identifying, by the computing device, a telephone number associated with the event in response to the detecting of the occurrence of the event;
determining, by the computing device, a name corresponding to the telephone number;
determining whether a user associated with the account has made contact using the telephone number associated with the event;
wherein, the contact is determined to have been made when the user communicates using applications associated with the account of the user;
wherein, the applications include a web interface associated with the account and a voice message service associated with the account;
informing the user that there is the telephone number is pending to become a new entry in the address book;
electronically storing the name and the telephone number as part of the address book, in response to receiving a response from the user to add the telephone number as the new entry.

15. The method as described in claim 14,
further comprising, determining whether a parameter associated with the telephone number satisfies a threshold;
wherein the parameter comprises one or more of, a number of times the telephone number has been encountered by a telephone system account, a time period associated with the telephone number, and a relationship between the telephone number and a second electronic network address book.

16. The method as described in claim 14, wherein, the predefined condition further includes an occurrence of an incoming or outgoing telephone call associated with the account.

17. The method as described in claim 14, wherein, the predefined condition further includes an occurrence of an incoming or outgoing email message associated with the account; and
wherein, the identifying the telephone number comprises analyzing the incoming or outgoing email message to identify the telephone number associated with a sender or an intended recipient of the email message.

18. A computing system for electronically populating an electronic organizer based on a call, the computer system, comprising:
a processor;
a bus coupled to the processor; and
a memory device coupled to the bus to communicate with the processor;
wherein, when in operation, the processor:
identifies automatically a telephone number associated with the call, the telephone call being placed by or received by a user using the account;
determining whether the user has made contact using the telephone number;
wherein, the contact is determined to have been made when the user communicates using applications associated with the account of the user;
wherein, the applications include a web interface associated with the account and a voice message service associated with the account;
informs the user that there is the telephone number is pending to become a new entry in the electronic organizer;
prompt the user whether the user wants to add the new telephone number as the new entry;
wherein, the user is informed that the telephone number is pending via a website interface;
receive a response from the user to add the new telephone number as the new entry,
electronically store the telephone number in the electronic organizer.

19. The computing system of claim 18, wherein, the processor further determines whether a parameter associated with the incoming or outgoing call satisfies a threshold; wherein the parameter further comprises a number of times the telephone number has been encountered by the account.

* * * * *